United States Patent [19]

Lange

[11] 4,194,621

[45] Mar. 25, 1980

[54] STRIP OF JOINED FASTENING ELEMENTS AND METHOD FOR ITS MANUFACTURE

[75] Inventor: Wilfried Lange, Brockhold, Fed. Rep. of Germany

[73] Assignee: Fa. Dieter Haubold Industrielle Nagelgerate, Hemmingen-Westerfeld, Fed. Rep. of Germany

[21] Appl. No.: 956,451

[22] Filed: Oct. 31, 1978

[30] Foreign Application Priority Data

Nov. 2, 1977 [DE] Fed. Rep. of Germany ....... 2748952

[51] Int. Cl.² ............................................. B65D 85/24
[52] U.S. Cl. ...................................... 206/343; 219/57
[58] Field of Search ..................... 206/340, 343, 345; 219/57, 58, 93

[56] References Cited

U.S. PATENT DOCUMENTS

| | | | |
|---|---|---|---|
| 1,228,789 | 6/1917 | Lachman | 219/58 X |
| 1,440,579 | 1/1923 | Brogan | 206/343 X |
| 2,208,835 | 7/1940 | Donovan | 219/58 X |
| 2,366,510 | 1/1945 | Frank | 206/343 |
| 2,999,146 | 9/1961 | Kaplan et al. | 219/93 |
| 3,481,459 | 12/1969 | Becht | 206/343 |
| 3,645,164 | 2/1972 | Wurth | 206/343 |
| 3,835,991 | 9/1974 | Brecht | 206/343 |

FOREIGN PATENT DOCUMENTS

2250375 7/1973 Fed. Rep. of Germany ........... 206/345
1341836 12/1973 United Kingdom ....................... 219/93

OTHER PUBLICATIONS

Welding Journal 8-1948, pp. 610–612.

*Primary Examiner*—Joseph Man-Fu Moy
*Attorney, Agent, or Firm*—Allison C. Collard; Thomas M. Galgano

[57] ABSTRACT

A strip of nails or other fastening elements for use in a suitable driving machine is made by resistance-welding together a number of fastening elements. For example, the heads of adjacent nails may overlap and be resistance-welded together through protuberances on the undersides of the heads.

6 Claims, 7 Drawing Figures

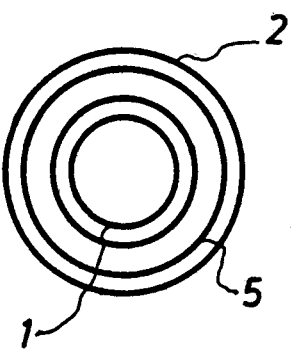
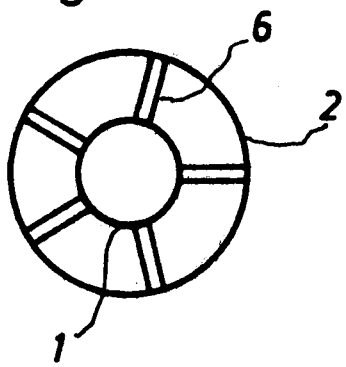
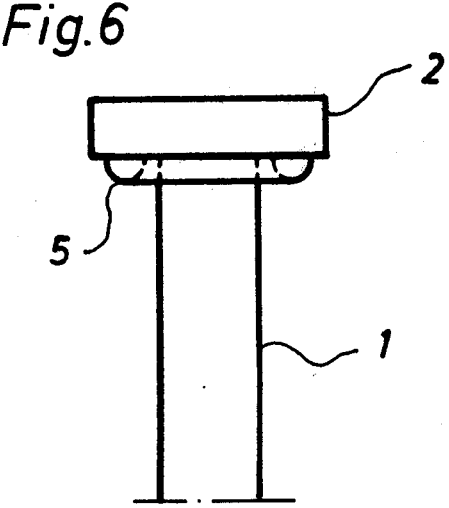

STRIP OF JOINED FASTENING ELEMENTS AND METHOD FOR ITS MANUFACTURE

This invention relates to a strip of joined fastening elements, such as nails, pins or screws for use in a suitable fastener-driving machine, and a method for its manufacture.

A number of proposals have been made for the construction of strips of joined fastening elements for use in driving machines. The use of adhesively-coated paper strips, for example, which are arranged between the fastening elements, is generally known. It is also known to use plastics strips interconnecting fastening elements as described in German Specification DT-AS 1 478 888. As well as using narrow plastics strips for this purpose wider strips are also used, into which the fastening elements are inserted. Also generally known is the manufacture of strips of nails which are simply joined together by adhesive, as described in German Specification DT-PS 1 808 604 and the use of wire which is glued or welded to the nails in order to form a nail strip, as described in German Specification DT-AS 1 603 970.

All the fastener strips of the prior art referred to above have the disadvantage that the strips require additional supporting or connecting elements respectively for their use in the magazine of a fastener-driving machine, which in turn means an additional working operation and apparatus for the manfacture of the strips. A further disadvantage is that in the use of such fastener strips in which the fastening elements are interconnected by support elements, after a fastening element has been driven home, the associated connecting or support elements have to be freed from the rest of the fastening element strip and from the driving machine. The connecting or support elements of spent strips of fastening elements can often lead to jamming or malfunctioning of the machine. Particles of the connecting or support elements may be expelled during the operation of the machine and can prove dangerous. In consequence, the driving machines have to be serviced frequently. The same applies to machines used for manufacturing fastener strips, the maintenance of such machines being time-consuming.

Another known type of fastening element strip is described in German Utility Model Specification No. 1 678 659, in which a strip of nails is described which is formed by directly joining the whole length of the shank of a nail, by means of glueing, soldering or spot welding to adjoining nails in a strip. This requires, however, specially designed nail heads with only a small impact area and joining together of nails by spot welding necessitates the use of contact rollers, which means increased manufacturing complexity.

It is the object of the present invention to provide a simplified method of manufacture for the strips of fastening elements, without requiring modification of the heads of the elements, and avoiding the disadvantages referred to above.

According to the invention there is provided a method for the manufacture of a strip of joined fastening elements, such as nails, pins, screws or the like for use in fastener driving machines, wherein the fastening elements, after assembly into a strip, are connected together by means of a resistance welding operation. For the purpose of joining the fastening elements together by resistance welding it is particularly advantageous to provide each fastening element with a protuberance or material accumulation at the site of each eventual welded connection. This material protuberance can have a part-spherical shape or it can have any suitable shape for the formation of a weld connection. A number of protuberances may be distributed evenly around the circumference of each fastening element. Alternatively, a single protuberance may extend circumferentially around the fastening element. The fastening elements could alternatively be provided with protuberances in the form of radial ribs.

The manufacturing cost of strips of fastening elements, in particular nail strips, in accordance with the method of this invention can be substantially reduced, because there is no need to provide any separate supplementary connecting element or equipment to form the connections, the protuberances being formed integrally with the fastening elements. Consequently the machines used for the manufacture of the strips of fastening elements are cheaper than those which employ separate strips such as plastics strips as connectors. Furthermore, the manufacture of the fastening element strips according to this invention is clean, since there is no residue, and fouling of the manufacturing equipment is avoided. Since, moreover, no residue is formed when the fastening elements are used, the fastener driving machine does not expel debris or particles, so that it is safer in use. Thus during both the manufacture of the strips and their use the place of work can be kept clean.

The provision on each fastening element of a number of hemispherical material accumulations or protuberances, distributed evenly around the circumference of the element, avoids the need to orientate the elements relative to each other circumferentially before interconnecting them to form a strip.

The invention will be further described, by way of example, with reference to the accompanying diagrammatic drawings in which:

FIG. 5 is an end view from the pointed end of a nail for use in another embodiment of the invention;

FIG. 6 is a side elevation of the head end of the nail shown in FIG. 5, and

FIG. 7 is an end view from the pointed end of a nail for use in a further embodiment of the invention.

Figure 1:
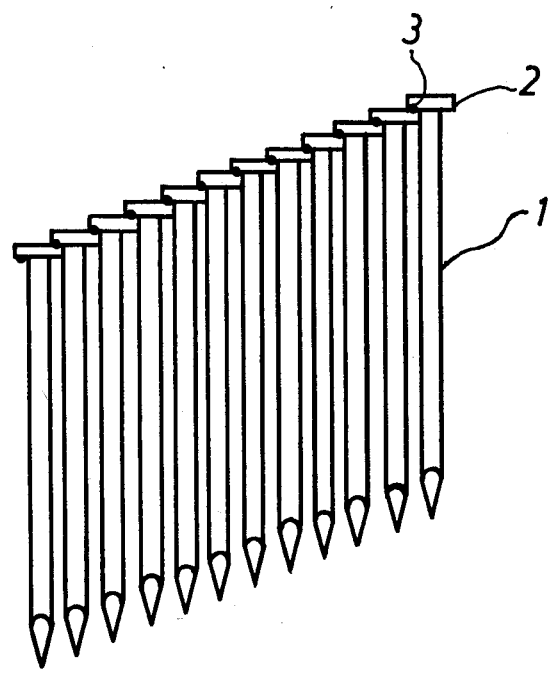
FIG. 1 is a side elevation of a nail strip according to one embodiment of the invention.
Figure 2:
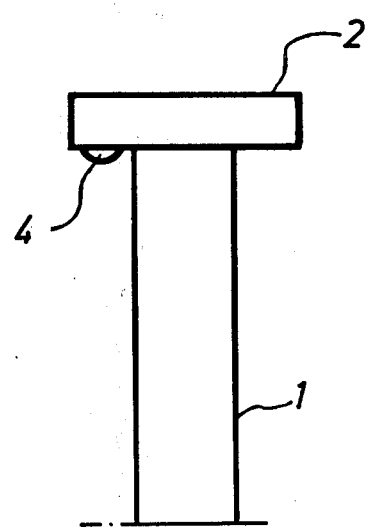
FIG. 2 is a side elevation on an enlarged scale of the head end of one of the nails forming part of the strip shown in FIG. 1.

FIG. 1 shows a number of parallel nails 1 having flat heads 2 which overlap each other like roofing tiles, forming a flat strip of nails the tips of which lie on a straight line which is inclined to the longitudinal axes of the nails. The overlapping heads 2 of adjacent nails 1 are joined together by spot welds 3 formed by resistance welding. In order to simplify the resistance-welding process, a protuberance 4 of hemispherical shape is provided on the underside of each nail head 2, as shown in FIG. 2, the protuberance 4 being formed at the same time as the nail 1. The protuberances 4 may have alternative profiles, for example triangular or cylindrical shapes. When a welding current is passed between the overlapping nail heads 2, using suitable contact rollers, the current passes through the protuberances 4, which form the spot welds 3.

Figure 3:
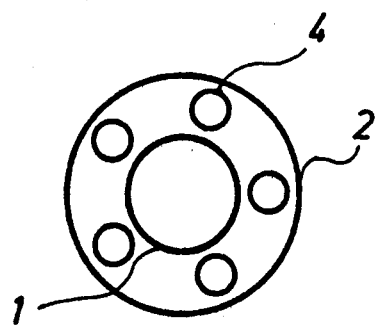
FIG. 3 is an end view of a nail for use in another embodiment of the invention, viewed from the pointed end.
Figure 4:
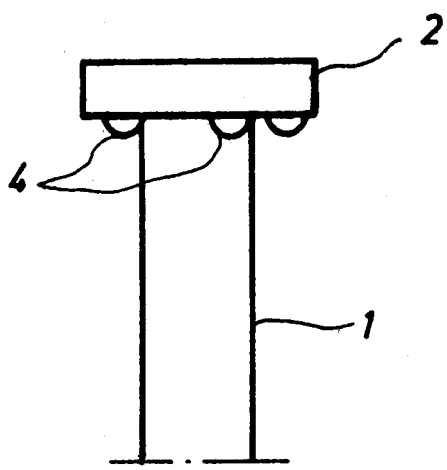
FIG. 4 is a side elevation of the head end of the nail shown in FIG. 3.

Instead of just one protuberance 4, it is better to provide several protuberances 4 distributed evenly on the underside of each nail head 2, as illustrated in FIGS. 3 and 4, in which five protuberances 4 are provided at equal circumferential intervals on the underside of the nail head 2. This avoids the need to sort and orientate the nails when arranging them into a strip before the welding process.

An alternative form of nail suitable for the formation of a welded nail strip is shown in FIGS. 5 and 6, in which an annular rib 5 is formed on the underside of the nail head 2 concentrically with the nail point. A part of each rib 5 would form a weld when the nails were assembled into a strip with their heads 2 overlapping, as illustrated in FIG. 1.

A further alternative is shown in FIG. 7, in which protuberances in the shape of radial ribs 6 are formed on the underside of the nail head 2. One of the ribs 6 would form a weld when overlapping nail heads 2 were welded together to form a strip of the kind illustrated in FIG. 1.

I claim:

1. A strip of joined fastening elements for use in a fastener-driving machine comprising:
   a multiplicity of interconnected fastening elements, each of which has a head at one end thereof, and a shank at the opposite end thereof, said shanks being substantially parallel to one another and said heads each having at least one protuberance formed thereon which is resistance welded to the head of an adjacent fastening element to form a spot weld connection and so as to achieve a stepped, overlapping relationship of said strip of fastening elements for permitting loading in a fastener-driving machine.

2. The strip according to claim 1, wherein said at least one protuberance comprises a raised circumferential protuberance, a part of which forms the spot weld connection.

3. The strip according to claim 2, wherein a plurality of said raised protuberances are evenly distributed over the underside of said heads of said fastening elements.

4. The strip according to claim 1, wherein said fastening elements comprise nails and said at least one protuberance is formed on the underside of each of said nails.

5. The strip according to claim 4, wherein said at least one protuberance comprises a plurality of radial ribs formed on the underside of said heads of said nails.

6. A method for the manufacture of a strip of joined fastening elements for use in fastener-driving machines, which fastening elements have a head at one end thereof and a shank at the other thereof, comprising the steps of:
   forming at least one protuberance on the heads of a multiplicity of fastening elements;
   arranging said fastening elements in a strip with the shanks thereof substantially parallel to one another and with the heads thereof arranged in a stepped, overlapping relationship with the protuberance on each head of the fastening elements being in abutment with the head of a successive adjacent fastening element; and
   resistance-welding adjacent nails of said strip together in the area of said protuberances so as to form a stepped strip of fastening elements ready for loading in a fastener-driving machine.

* * * * *